United States Patent [19]

Nelson et al.

[11] Patent Number: 4,777,093
[45] Date of Patent: Oct. 11, 1988

[54] HIGH CARBON COMPOSITE

[75] Inventors: Daniel C. Nelson, Old Orchard Beach; Roger T. Pepper, Scarborough, both of Me.

[73] Assignee: Fiber Materials, Inc., Biddeford, Me.

[21] Appl. No.: 36,084

[22] Filed: Apr. 9, 1987

Related U.S. Application Data

[60] Division of Ser. No. 899,022, Aug. 22, 1986, which is a continuation-in-part of Ser. No. 714,925, Mar. 22, 1985, abandoned.

[51] Int. Cl.$^4$ ................................................ B32B 9/00
[52] U.S. Cl. ..................................... 428/408; 428/902
[58] Field of Search ............................. 428/408, 902; 423/447.1, 447.2, 447.6

[56] References Cited

U.S. PATENT DOCUMENTS 4,178,413  12/1979  De Munda ........................... 428/408
4,350,672   9/1982  Layden, Jr. et al. ................ 423/455

*Primary Examiner*—Peter A. Nelson
*Attorney, Agent, or Firm*—Schiller, Pandiscio & Kusmer

[57] ABSTRACT

A carbonizable body is formed by infusing a plurality of preoxidized (preferably stabilized by known processing to have about 9 to 14 weight percent oxygen) polyacrylonitrile fibers in a polar liquid plasticizer, preferably water, capable of extracting a tarry leachate from the fibers. The infusion of the fibers in the plasticizer is continued for a sufficient time for a substantial amount of leachate to form on the surface of the fibers, and are then consolidated or diffusion-bonded to one another or other fibers, as by orienting the treated fibers in a mold and subjecting them to isostatic pressing at relatively low temperatures and pressure. Further processing of the consolidated fibers with appropriate heat treatment in an inert atmosphere will produce a carbonized bulk product with higher values of Young's modulus for the carbonized material than have been previously achieved at such carbonization temperatures. This carbonaceous product can be truly graphitized by subsequent heat treatment to obtain material with a modulus of at least $40 \times 10^6$ psi, and a tensile strength of at least $20 \times 10^3$ psi.

3 Claims, No Drawings

HIGH CARBON COMPOSITE

This application is a divisional application of our copending application Ser. No. 899,022, filed Aug. 22, 1986, for High Carbon Composite which is a continuation-in-part of application Ser. No. 714,925 now abandoned.

The present invention relates to carbon materials and more particularly graphite bulk articles formed by the pyrolysis of a plurality of consolidated preoxidized fibers, particularly polymeric polyacrylonitrile fibers.

Carbon-carbon composites are generally carbon matrices reinforced with carbon fibers aligned or distributed therein. Such composites have been formed by a variety of methods, usually involving the impregnation of a porous carbon fiber structure with a resin, pyrolytic carbon or the like. For example, a mat, felt, tow or the like of carbon fibers may be impregnated by a pressure or evacuation technique with a binder of pitch or a synthetic carbon-yielding resin that is subsequently polymerized. The impregnated body is then pyrolyzed by heating to temperatures sufficiently high to convert the impregnant binder to a carbon matrix.

Alternatively, a carbon matrix can be formed by impregnating a porous, carbon fiber body with a hydrocarbon gas that is then thermally decomposed to carbon. In either case, the carbonized body can be reimpregnated and repyrolyzed to increase density and improve other properties. The resulting carbon matrix, however, is generally not well bonded to the fibers because of shrinking of the matrix during pyrolysis. Further, the composite often tends to have a coarse structure with significant residual porosity and low Young's modulus.

In prior art manufacturing of carbon fibers, it is often preferred to use precursor fibers of acrylic polymers such as polyacrylonitrile (PAN). As used herein, the term PAN is intended to include acrylic fibers containing at least 85% polyacrylonitrile, the balance including other polymers. Such PAN fibers do not melt prior to pyrolytic decomposition, and pyrolyzed fibers produced from PAN have substantially greater strength than fibers produced from other inexpensive precursors such as pitch or regenerated cellulose-based materials.

It has long been known that yarns prepared from acrylonitrile will, during heating in an oxygen-containing atmosphere at about 200° C., undergo a change resulting in a black color and fire-resistant properties for the yarn. It is believed that during such heating extensive dehydrogenation of the polymer backbone occurs and some of the pendent nitrile groups are hydrolyzed to the amino or carboxylic structure, thereby catalyzing a thermal, block-type polymerization of properly oriented nitrile groups. Additionally, such heating also produces molecular cross-linking, induced at least in part by oxidizing agents. Thus, apparently the oxidation process causes the polymer chains in the fiber to link intramolecularly to form a ladder structure, markedly altering the physical characteristcs of the fibers. For example, such oxidized fibers no longer are soluble in polyacrylonitrile solvents such as dimethyl formamide or tetramethylene cyclic sulfone.

PAN and other fibers for use in carbon composites are usually heat-stabilized by a thermal oxidation process wherein the fibers are heated in an oxygen-containing atmosphere at between about 200° C. and 400° C. until a desired oxygen content, usually between about 5 to 15 weight percent, preferably around 10 weight percent, is achieved. Such heat-stabilized, oxygen-containing fibers are known as preoxidized fibers.

Strictly speaking, when preoxidized PAN is subjected to temperatures above about 1000° C., it loses its noncarbon content, and because it does not melt, it chars. According to Jenkins and Kawamura, *Polymeric Carbons—Carbon Fiber, Glass and Char*, Cambridge University Press, London, 1976, the charred material is termed "polymeric carbon", a material that should be sharply differentiated from graphitic carbon produced by pyrolysis of cokes formed from a liquid or tarry state. The foregoing appears to explain the comment of J. Hermann in his article "Electrical Conductivity of Vapor-Grown Carbon Fibers", *Carbon*, Vol. 21, No. 4, pp. 431, 435, that it is "... common knowledge that PAN fibers do not graphitize."

Polymeric carbon is characterized by having a turbostratic network of carbon atoms as opposed to the extensive graphite sheets that must necessarily exist in true graphitic carbon. Cf. Jenkins and Kawamura, supra, at page 2. These two forms of carbon can also be distinguished readily from one another by a number of tests based on the different crystalline structures of the materials.

For example, polymeric carbon made from PAN will have a relatively disordered structure and will typically exhibit carbon basal planes that are concentric at the outer portions of the fiber, but are radial internally. The density of the fiber will be around 1.7 to 1.8 g/cc.

On the other hand, graphitic carbon fibers made from pitch have a well ordered structure and will typically provide graphite "planes" that are substantially all radially disposed out to the fiber surface. The density of such graphitic pitch fibers will typically be about 2.1 to 2.2 g/cc. Also, in true graphite, X-ray studies through scanning electron microscopy will show C-direction spacing to be below about 3.5Å, the theoretical spacing being 3.354Å.

The present invention constitutes an improved approach to the problem of using the expensive multiple cycle matrix impregnation/graphitization processing heretofore required to provide carbon bodies, and also results in high values of Young's modulus, not heretofore achieved in carbon-carbon bodies. To these ends, the binder material employed in the present invention is derived in situ directly from preoxidized fibers themselves. The binder material is formed by infiltrating a plurality of preoxidized fibers with a liquid polar plasticizer such as water or an alcohol having from 2 to 10 carbon atoms per molecule, the plasticizer and fibers reacting with one another to extract or leach a tarry leachate from the infiltrated fibers and coating the latter. The coated fibers are then consolidated or diffusion bonded to one another at high pressure, typically at a temperature below 400° C. as by pressing, hot isostatic pressing, autoclaving, extrusion or the like. After diffusion bonding, the bulk material formed is no longer fibrous in nature, but the bulk structure substantially retains the axial molecular orientation of the original fibers. This bulk material can be carbonized at atmospheric pressure to obtain higher values of Young's modulus for the carbonized material than have been previously achieved.

In an important aspect of the present invention, the coated fibers are both consolidated and pyrolyzed, for example at 600° C. under pressure, all preferably by hot isostatic pressing (HIP), while avoiding cooling between consolidation and pyrolysis. After the HIP process is complete, again the bulk material formed is no longer fibrous in nature, but the bulk structure substantially retains the molecular orientation of the original fibers. This bulk material can be carbonized at lower temperatures than those heretofore required to obtain a given value of Young's modulus for the carbonized material. When preoxidized PAN fibers have thus been consolidated and pyrolyzed under pressure, the carbonaceous product can be truly graphitized by subsequent heat treatment to obtain material with a modulus of at least $40 \times 10^6$ psi, and a tensile strength of at least $20 \times 10^3$ psi.

A principal object of the present invention is therefore to provide a method of forming a bulk carbon structure from preoxidized fibers, which structure has a high modulus of elasticity. Yet another object of the present invention is to provide a bulk carbon structure from precursor preoxidized fibers, which structure is not grossly fibrous but retains the molecular orientation characteristic of the preoxidized fibers, and therefore can be carbonized or graphitized to produce high strength, high modulus bulk carbon or graphite bodies with minimal cracking.

Other objects of the present invention are to provide such a method wherein preoxidized fibers are infused with a plasticizer to form a tarry exudate that serves as a binder in a subsequent consolidation step, and to provide such a method wherein the plasticizer employed is capable of extracting a tarry leachate from the infused preoxidized fibers, and thus avoids the need to add any matrix material to the resulting carbon body. Another important object of the present invention is to provide such a method wherein although the structure is formed from preoxidized polyacylonitrile fibers, it can nevertheless be truly graphitized by subsequent heat treatment to produce high strength, high modulus graphite bodies of low porosity and minimal cracking.

Yet other objects of the present invenion will in part be obvious and will in part appear hereinafter. The invention accordingly comprises the processes comprising the several steps and relation of one or more of such steps with respect to the others, and the products and compositions possessing the features, properties and relation of elements, all of which are exemplified in the following detailed disclosure and the scope of the application of which will be indicated in the claims.

For a fuller understanding of the nature and objects of the present invention, reference should be had to the following detailed description.

Generally, in the process of the present invention, a plurality of preoxidized fibers are infused, preferably to saturation, with any polar liquid plasticizer capable of extracting a tarry leachate from the fibers. The fibers may be any carbonaceous precursor capable of being so infused, such as those formed of rayon and the like, but are preferably polyacrylonitriles. For example, typical precursor fibers are "Grafil S.A.F." from Hysol Grafil Co., a polyacrylonitrile believed to contain 5% methyl acrylate and 1% itaconic acid, "Dralon T", from Bayer Aktiengesselschaft, believed to be pure acrylic homopolymer, and many others. The precursor fibers should be stabilized by known processing to have about 7 to 14 weight percent oxygen.

The plasticizer can be any of a large number of polar solvents such as water, ethylene carbonate, dimethyl sulfoxide, and alcohols e.g. normal saturated alcohols such as ethyl alcohol, n-pentyl alcohol, n-hexyl alcohol, n-heptyl alcohol, n-octyl alcohol, n-nonyl alcohol and n-decyl alcohol, tertiary-pentyl alcohol, cyclo-pentanol and cyclohexanol; unsaturated alcohols such as ethylene glycol, propylene glycol, 1,3 propanediol and glycerol; and aromatic alcohols such as benzyl alcohol, a-phenylethyl alcohol and B-phenylethyl alcohol. While ethylene glycol is a preferred alcohol, at least from a cost viewpoint the preferred plasticizer is simply water.

The infusion of preoxidized fibers in the plasticizer is continued at a temperature above, at or below the boiling point of the plasticizer for a sufficient time for a substantial amount of leachate to form on the surface of the fibers, i.e. until the pre-oxidized fibers have imbibed at least 5 and up to as much as 80 percent by weight of the plasticizer in terms of the fiber weight. The minimum infusion time is, inter alia, a function of the fiber diameters and the infusion temperature and pressure. It is believed that during this period, the infused plasticizer extracts short fragments of the polymer chain from the interior of the fiter, which fragments were formed during the oxidation process. The exact composition of the tarry exudate is not known, but it is in the form of a dark, viscous, sticky fluid. The infiltrated plasticizer also causes some swelling and softening of the preoxidized fibers, rendering them much more flexible.

After the preoxidized fibers have been appropriately infused with plasticizer to form the desired exudate on the fiber surfaces, a plurality of the treated fibers can then be readily consolidated or diffusion-bonded to one another or other fibers by a variety of techniques at comparatively low temperatures and pressures, e.g. as low as 200° C. and 2000 psi. Bonding can be achieved statically by orienting a plurality of the treated fibers in a mold and subjecting them to isostatic pressing at relatively low temperatures and pressure. On removal of the pressed product from the press enclosure, some residual exudate may remain behind. Unlike the prior art, however, because of the high plasticity given to the fibers by their swollen and softened state when treated according to the present invention, and the presence of the binding exudate, a plurality of the treated fibers may be consolidated by the dynamic process of hot extrusion. In either case, the resulting bulk structure or shaped product retains the internal molecular orientation present in the original preoxidized PAN fibers. The resulting bulk structure also shows little or no gross fiber/matrix differentiation or clear boundaries characteristic of prior art composites.

Further processing of the consolidated fibers is desireable to fully utilize the infusion treatment of the present invention. The shaped product produced by consolidating the leached and coated preoxidized fibers possesses the strength and modulus of the original preoxidized fibers, e.g. a relatively low modulus of less than $1 \times 10^6$ psi and relatively low strength, typically around $2 \times 10^4$ psi or less. However, this material is convertible to a high modulus (e.g., up to $5 \times 10^7$ psi) and high strength (e.g. up to $8 \times 10^5$ psi) carbon body with appropriate heat treatment in an inert atmosphere. Such heat treatments are generally determined by the end properties and shape configurations desired, and in general call for gradual heating up to between 1400° C. and 3200° C. for maximum strength and stiffness. Slow heating that avoids sudden release of volatiles within the structure, and maintenance of the shaped product under pressure during the carbonization cycle, both serve to reduce or minimize crack formation in the resulting carbonized bulk product.

U.S. Pat. No. 3,817,700 teaches treatment of PAN fibers with a catalytic amount of alkaline or alkaline earth metal substituted polyol in a polyol solvent prior to oxidation of the fiber, thus permitting thermal oxidation to occur at fairly high temperatures.

The problem of differential fiber/matrix dimensional changes in carbon composites has been addressed in U.S. Pat. No. 3,927,186 which suggests treating flexible urethane resin strands with a liquid polymerizable furan resin or resin precursor such as furfuryl alcohol, to swell the strand. After removal of all liquid resin from the surfaces of the strands, the swollen urethane is thermally carbonized. An alternative solution offered by U.S. Pat. No. 4,350,672 to this problem, is to completely eliminate any binder or matrix by relying on the plasticity of precursor fibers to effect bonding by compression molding prior to pyrolysis. To that end, the latter patent teaches assembling a plurality of synthetic polymer fibers, preferably polyacrylonitrile (PAN) polymers or aromatic polycyclic polymers such as certain polyamides, polyimides, polybenzimidazoles, or polythiadiazoles, and subjecting the assembled fibers simultaneously to a temperature and pressure sufficient to cause heat distortion flow and bonding between contiguous fibers. The bonded fibers are then pyrolyzed in a non-oxidizing atmosphere at relatively high temperatures, for example up to 3500° C.

Consideration of the conditions set forth in the Examples in U.S. Pat. No. 4,350,672, (using preoxidized acrylic copolymer fibers of 8% oxygen content) reveals that the carbonization processing temperatures required to obtain a given Young's modulus are substantially higher than those needed to obtain similar results in the present invention. For example, in U.S. Pat. No. 4,350,672, heat treatment to 1700° C. is required to produce a carbon structure with a Young's modulus of $25 \times 10^6$ psi. In the present invention, heat treatment to 1000° C. provides a carbon article with a Young's modulus of $24 \times 10^6$ psi; continued processing to 1400° C. raises the modulus to $28 \times 10^6$ psi. These values should be compared with the Young's modulus of typical fine-grained bulk graphite of from $1 \times 10^6$ to $2 \times 10^6$ psi, and is consistent with the typical Young's modulus of other prior art unidirectional, organic resin and metal matrix composite articles ($15 \times 10^6$ to about $30 \times 10^6$ psi).

The infiltrated preoxidized fibers coated with the leachate of the present invention can also be utilized as a matrix precursor with fully carbonized or graphitized fibers as a conventional reinforcement. For example, one can prepare a composite layup of alternate layers of carbonized or graphitized fibers with preoxidized PAN fibers. The entire layup may be infused with plasticizer according to the teachings of the present invention to produce a leachate in situ, or the preoxidized fibers can be pretreated in like manner prior to forming the layup. In either instance, the resulting layup is then consolidated at low temperatures and pressures using standard platen pressing, hot isostatic pressing, autoclave or extrusion techniques. Final firing of the composites is then carried out to the required carbonization or graphitization temperature in an inert atmosphere. The layups can comprise aligned or random carbon fibers in a matrix precursor of aligned or randomly oriented preoxidized fibers. The matrix formed from the treated preoxidized fibers, being highly molecularly oriented, provides additional strength and stiffness, and also permits greater control of the relative thermal expansion values of the matrix and reinforced material.

As noted above, an important variation of the present invention is the concurrent consolidation and pyrolysis of the infused fibers. For this variation, importantly the preoxidized precursor fibers (with oxygen content between about 9 to 14 weight percent) are stabilized to have oxidized densities of between 1.35 and 1.45 g/cc for reasons elucidated later herein. In the preferred process, these preoxidized fibers in the form of tops, yarns, tows and the like are laid up unidirectionally and pulled into a plastic envelope or tube, typically of polytetrafluoroethylene, polyolefin heat shrinkable material or the like. The fibers can thus be packed into the envelope to a 55 to 60% fiber volume maximally. In order to improve the packing density, the packed envelope may be inserted into a metal tube, (typically stainless steel with a 0.050" wall, 1½" outside diameter) and the latter drawn through a series of metal-drawing dies (e.g. 5 dies are required to provide a reduced outside diameter of about 1.1"). This serves to increase the fiber volume inside the envelope to as high as 75 to 80%.

The metal jacket is then removed, as by machining, and the compressed plastic tube is cut into short lengths, typically 9". One or more of these lengths is placed in a plastic bag (e.g. prepared from 1 mil polytetrafluoroethylene film). Water, for example 70 weight percent with reference to the fiber weight, is added to the bag and the fiber is allowed to soak, typically overnight. It has been found that if the density of the preoxidized fibers is less than about 1.35 g/cc, the fibers tend to dissolve in the plasticizer on heating, leaving no fibrous structure. On the other hand, if the density of the fibers is greater than about 1.45, the reaction between the fibers and the plasticizer tends to be too slow or insufficient.

Following infusion of the fibers by the plasticizer, the bag is closed and placed in a receptacle such as an open metal can of 20 gauge stainless steel, and held in spaced relation to the bottom of the can by an appropriate steel barrier or tool. The can is then filled with a pressure transfer medium such as comminuted refractory material (e.g. carbon black, sand or the like) or a metal alloy such as PbBi that preferably melts at a low temperature. In using such alloy, one simply pours the liquid metal in the can containing the specimen and allows it to chill cast. The can with the spaced specimen trapped in the frozen metal is then placed in the pressure vessel. It will be appreciated that in loading the can with the transfer medium, the latter surrounds the bag in whole or in part. Thus when the can and contents are subjected to heat and pressure in the pressure vessel, isostatic compaction of the specimen occurs. Gaseous reaction products bubble through or diffuse to the surface of the pressure transfer medium. The use of metal alloy is preferred because it is easy to use, chill casts, and being rendered liquid at reasonably low temperature, accomodates well for shrinkage of the sample incurred in the subsequent processing.

In order to effect consolidation of the infused fibers and subsequent pyrolysis, the can with its contents is then preferably subjected to hot isostatic pressing at pressures that may be as high as 15000 psi and at temperatures brought up to above 400° C. at a relatively slow rate, e.g. 20° C./hour. Where the transfer medium is a metal alloy, the latter is selected to be molten at the temperature at which initial consolidation occurs, e.g. from about 150° C. to 300° C. Above those temperatures, the consolidated specimen will pyrolize to basically form a carbon body. It is important to avoid both depressurization and cooling of the sample between consolidation and pyrolysis, because pyrolysis under pressure yields samples with fewer cracks. During pyrolysis, the specimen decomposes in part to yield a number of gases, such as ammonia, which collect within the can, ultimately providing a shrunken carbon skeleton.

The can is allowed to cool under pressure to below about 200° C. before removal from the pressure vessel. To remove contents of the can, one need only remelt the alloy surrounding the specimen thereby permitting the specimen and any holder to rise to the surface of the molten metal.

It is hypothesized that in this hot isostatic processing, as evidenced by the low carbon yields and microstructure of the resulting product, the less stable center regions of the preoxidized PAN fibers are "squeezed out" during consolidation and pyrolysis. The result following graphitization, is that there is a predominantly relatively coarse lamellar microstructure (as compared to that of graphite fibers) consisting of distorted ribbons extending several fiber diameters in the off-axis direction that have a general alignment in the longitudinal axis of the product. High axial modulus, high transverse modulus and high shear strength result from this graphitic, ribbon-like structure.

For a better understanding of the present invention, representative examples are given as follows, all percentages being by weight unless otherwise indicated. Densities of samples were measured by the Archimedes technique, typically using propanol to infiltrate the sample pores, to provide apparent densities.

EXAMPLE I

A two meter length of PAN fibers, preoxidized to approximately 8 weight percent oxygen, was wound on a cylindrical glass mandrel and bathed in boiling ethylene glycol for 15 minutes. The mandrel and fibers were removed from the alcohol bath and permitted to cool to room temperature. Upon removal of the treated wound fibers from the mandrel, the resulting product maintained its cylindrical shape and appeared to have sintered into a substantially unified structure.

EXAMPLE II

A specimen, formed of 34 ends of a 6000 filament tow of an oxidized PAN-based fiber (Hysol Grafil SAF, 10 wt. % Oxygen), was laid into a ½"×5" area of a steel mold in a unidirectional fashion. Approximately 100 cc of ethylene glycol was poured over the fiber in order to completely saturate it. After an imbibition period of thirty minutes, the specimen was pressed to form a unified structure having a thickness of 0.056".

EXAMPLE III

A preform, about 50" in length, formed of 588 ends of 10 ply, Z-twist preoxidized PAN-based fiber (Courtelle), was wrapped on a vertical frame in a unidirectional fashion and pulled into a tube (1.23" internal diameter) made of FEP fluoropolymer. A 9" specimen, cut from the filled tube, was plasticized by absorption of deionized water in an amount of about 90% of the dry weight of the fiber, and sealed in a bag formed of polytetrafluorethylene film.

The bag was inserted into a stainless steel can and surrounded with molten PbBi alloy that was allowed to set. The can was then hot isostatically pressed at $15 \times 10^3$ psi, while the temperature was increased from room temperature to 600° C. at a rate of about 5° C./15 minutes. The pressure and temperature were then reduced to permit removal of the specimen from the can and alloy. Following removal of the specimen from the press, the specimen was subjected to high temperature pyrolysis up to 2500° C. under argon in a closed-atmosphere, quartz and graphite apparatus utilizing a Westinghouse R/F Generator as an inductive heat source. After an initial thorough atmosphere purge with argon, heating was initiated, bringing the specimen from room temperature (27° C.) to 2500° C. at a rate of 100° C./hour. The specimen was allowed to slowly cool in the furnace under the argon.

Following heat treatment, the density of the specimen was measured in an isopropyl alcohol solution and found to be 2.14 g/cc. Young's modulus, measured ultrasonically axially was $26.8 \times 10^6$ psi, and $1.3 \times 10^6$ psi, transversly.

X-ray measured crystal spacings taken on the sample confirmed the graphite nature of the fibrous carbon structure. The interlayer C-spacing was measured at 3.383Å.

EXAMPLE IV

A specimen was prepared as in Example III except that it was subjected to heat treatment to 3200° C. X-ray measurement provided as crystal spacing of 3.359Å, extremely close to the theoretical crystal spacing of 3.354Å for graphite. The Young's modulus, measured by flexure, was $47.9 \times 10^6$ psi.

EXAMPLE V

A preform, about 50" in length, formed of 586 ends of 10 ply, Z-twist preoxidized PAN-based fiber (Courtelle), was wrapped on a vertical frame in a unidirectional fashion and pulled into a tube (1.23" internal diameter) made of FEP fluoropolymer. A 10" specimen, cut from the filled tube, was plasticized by absorption of deionized water in an amount of about 80% of the dry weight of the fiber, and sealed in a bag formed of polytetrafluorethylene film.

The bag was then hot isostatically pressed in a PbBi alloy at $15 \times 10^3$ psi while increasing the temperature from room temperature to 700° C. at a rate of about 5° C./15 minutes. The pressure and temperature were then reduced to permit removal of the specimen from the alloy and can. Following removal of the specimen from the pressure vessel, the density was measured in isopropyl alcohol as 1.67 g/cc. The specimen was then heat treated as in Example III, but only to 1600° C. at a rate of 100° C./hour, and allowed to slowly cool in the furnace under the argon.

Following heat treatment, the density of the specimen was measured in an isopropyl alcohol solution and found to be 2.03 g/cc. Flexure strength and modulus were measured as respectively $17.8 \times 10^3$ psi, and $8.24 \times 10^6$ psi. Sonic modulus was measured in the axial direction at $10.6 \times 10^6$ psi. The flexural modulus was measured at $9.49 \times 10^6$ psi in the axial direction and $4.26 \times 10^6$ psi in the transverse direction. Compression strengths were $18.1 \times 10^3$ psi axially and $2.4 \times 10^3$ psi transversely. Thermal conductivity at 1600° C. was 0.360 w cm$^{-1}$·C$^{-1}$. Diffusivity at 1600° C. measured 0.106 cm$^2$. Interlaminar shear of $1.98 \times 10^3$ psi was found. Thermal expansion at 1600° C. was measured as 0.34%. X-ray measurement of the interlayer spacing at 3.43Å again confirmed the graphite nature of the fibrous carbon structure.

EXAMPLE VI

A preform, about 50" in length, formed of 38 ends of 10 ply, Z-twist preoxidized PAN-based fiber (Courtelle), was hand-wrapped in a unidirectional horizontal fashion and pulled into a tube (1.23" internal diameter) made of FEP fluoropolymer. The filled tube was then inserted into a stainless steel tube and the latter was drawn down to an internal diameter of 1.118". Following drawing, a 9" specimen was cut from the tube and the external stainless jacket was removed using a Bridgeport Millng Machine, restoring the FEP as the outer casing. The specimen was then plasticized by absorption of deionized water in an amount of about 70% of the dry weight of the fiber, and sealed in a polytetrafluorethylene bag.

The bag was then hot isostatically pressed as described in Example III, the specimen was removed from the press and heat treated to 2500° C. as in Example III. Following heat treatment, the bulk density was measured as 1.77 g/cc. The specimen was then placed inside a metal can and the remaining space in the can was filled with petroleum-based Ashland 240 pitch. The specimen was impregnated with the pitch by hot isostatically pressing the can at $15 \times 10^3$ psi, while increasing the temperature from room temperature to 600° C. at a rate of about 5° C./15 minutes. The pressure and temperature were then reduced to permit removal of the specimen from the can. Following removal of the specimen from the can, the specimen was subjected to high temperature pyrolysis as described in Example III.

Following the second heat treatment, a number of tests were conducted on the resulting product. The bulk density was measured at 1.93 g/cc, a substantial increase over the density measured following the first heat treatment. Interlaminar shear strength measured greater than $3.47 \times 10^3$ psi. Flexure strength of $33 \times 10^3$ psi, a modulus of $40 \times 10^6$ psi, and elongation of 0.085% were also found in measuring the specimen following the second heat treatment.

EXAMPLE VII

To obtain comparative data, unplasticized fibers were treated by a process similar to that set forth in Example III. To this end, as shown in the following Table, preoxidized fibers having a density of 1.47 (Grafil SAF from Hysol Grafil, a polyacronitrile fiber believed to include 5 wt. percent methyl acrylate and 1 wt. percent itaconic acid) were treated under various conditions by the hot isostatic process without any infusion of plasticizer. In the selected runs shown, the temperatures are in degrees C, the pressures in pounds/in² and the resulting densities in grams/cc.

TABLE

| Sample # | Temp. | Pressure | Density |
|----------|-------|----------|---------|
| 1 | 150 | 69 | 1.46 |
| 2 | 175 | 130 | 1.48 |
| 3 | 200 | 256 | 1.49 |
| 4 | 225 | 367 | 1.52 |
| 5 | 700 | 15,000 | 1.72 |

Exemplary fibers from the process shown as sample #4 were treated at graphitization temperatures of 1600° C., 1750° C. and 2300° C. to yield respective products with densities of 1.85, 186 and 1.89, considerably below the densities achieved in Examples III through V above wherein a plasticizer was used.

Since certain changes may be made in the above described processes and products without departing from the scope of the inventions herein involved, it is intended that all matter contained in the above description shall be interpreted in an illustrative and not in a limiting sense.

What is claimed is:

1. A high-strength, high-modulus, bulk carbon article comprising a plurality of carbon fibers in a carbon matrix, said matrix being formed from polyacrylonitrile precursor fibers, said article having a modulus of elasticity of at least $40 \times 10^6$ psi, a tensile strength of at least $20 \times 10^3$ psi, having an internal molecular orientation similar to that of preoxidized polyacrylonitrile fiber, and having an interlayer C-spacing substantially not greater than 3.383Å.

2. A bulk carbon article as defined in claim 1 wherein said carbon is substantially graphitic.

3. A bulk carbon article as defined in claim 1 wherein said carbon fibers are formed from said polyacylonitrile precursor fibers.

* * * * *

UNITED STATES PATENT AND TRADEMARK OFFICE
CERTIFICATE OF CORRECTION

PATENT NO. : 4,777,093

DATED : October 11, 1988

INVENTOR(S) : Daniel C. Nelson, et al.

It is certified that error appears in the above-identified patent and that said Letters Patent is hereby corrected as shown below:

Claim 3, column 10, line 44, delete "polyacylonitrile" and substitute therefor -- polyacrylonitrile --.

Signed and Sealed this

Twenty-first Day of February, 1989

Attest:

DONALD J. QUIGG

*Attesting Officer*  *Commissioner of Patents and Trademarks*